US009569025B2

(12) United States Patent
Curtis (10) Patent No.: US 9,569,025 B2
(45) Date of Patent: Feb. 14, 2017

(54) LCD CONTROLLER WITH CAPACITIVE TOUCH INTERFACE

(71) Applicant: Microchip Technology Incorporated, Chandler, AZ (US)

(72) Inventor: Keith Edwin Curtis, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 86 days.

(21) Appl. No.: 14/254,127

(22) Filed: Apr. 16, 2014

(65) Prior Publication Data

US 2015/0301663 A1    Oct. 22, 2015

(51) Int. Cl.
*G02F 1/1333* (2006.01)
*G06F 3/041* (2006.01)
*G06F 3/044* (2006.01)

(52) U.S. Cl.
CPC ....... *G06F 3/0412* (2013.01); *G02F 1/133308* (2013.01); *G06F 3/044* (2013.01); *G06F 3/0416* (2013.01)

(58) Field of Classification Search
CPC  G06F 3/0412; G06F 1/133308; G06F 3/0416; G06F 3/044
See application file for complete search history.

(56) References Cited

U.S. PATENT DOCUMENTS

| | | | | |
|---|---|---|---|---|
| 5,634,080 | A * | 5/1997 | Kikinis ................ | G06F 1/1626 345/156 |
| 6,683,587 | B2 * | 1/2004 | Gulsen ..................... | G09G 3/18 345/34 |
| 7,705,834 | B2 | 4/2010 | Swedin .................... | 345/174 |
| 8,531,431 | B2 | 9/2013 | Swedin .................... | 345/174 |
| 2004/0155991 | A1 | 8/2004 | Lowles et al. .............. | 349/12 |
| 2007/0046639 | A1 | 3/2007 | Swedin .................... | 345/173 |
| 2008/0062139 | A1 * | 3/2008 | Hotelling ............ | G02F 1/13338 345/173 |
| 2010/0188345 | A1 * | 7/2010 | Keskin .................... | G06F 3/045 345/173 |
| 2011/0102360 | A1 * | 5/2011 | Chen .................... | G06F 3/0412 345/173 |
| 2012/0268416 | A1 * | 10/2012 | Pirogov .................. | G06F 3/044 345/174 |

(Continued)

FOREIGN PATENT DOCUMENTS

| | | | | |
|---|---|---|---|---|
| CN | 203117617 U | 8/2013 | ............. | G02F 1/133 |
| EP | 2104023 A2 | 9/2009 | ............. | G06F 3/041 |

OTHER PUBLICATIONS

Written Opinion of the International Searching Authority, International Application No. PCT/US2015/025358, Oct. 22, 2015.*

(Continued)

*Primary Examiner* — Lun-Yi Lao
*Assistant Examiner* — Elliott Deaderick
(74) *Attorney, Agent, or Firm* — Slayden Grubert Beard PLLC (57) ABSTRACT

An integrated circuit device has a touch controller with at least one input, a liquid crystal display (LCD) controller with a plurality of outputs, an external interface comprising a plurality of external pins, and a multiplexer operable in a first mode to connect the plurality of external pins with the plurality of outputs of the LCD controller and in a second mode to connect at least one of the plurality of external pins with the touch controller.

24 Claims, 5 Drawing Sheets

(56) References Cited

U.S. PATENT DOCUMENTS

| | | | |
|---|---|---|---|
| 2013/0076648 A1 | 3/2013 | Krah et al. | 345/173 |
| 2013/0088242 A1 | 4/2013 | Lundstrum et al. | 324/609 |
| 2013/0241868 A1 | 9/2013 | Kim et al. | 345/174 |

OTHER PUBLICATIONS

International Search Report, International Application No. PCT/US2015/025358, Oct. 22, 2015.*
International Search Report and Written Opinion, Application No. PCT/US2015/025358, 12 pages, Jul. 24, 2015.

* cited by examiner

LCD CONTROLLER WITH CAPACITIVE TOUCH INTERFACE

TECHNICAL FIELD

The present disclosure relates to controllers with human device interface, in particular display controllers.

BACKGROUND

Controllers, such as microcontrollers or other system on a chip still often require to interface with external components, in particular human device interfaces. Typical examples for such human device interfaces are liquid crystal display (LCD) and capacitive touch interfaces. LCDs, in particular segmented LCDs and capacitive touch interfaces often require many pins to couple with a respective e controller.

SUMMARY

There exists a need for a controller with a human device interface with a reduced number of necessary pins.

According to an embodiment, an integrated circuit device may comprise a touch controller comprising at least one input, a liquid crystal display (LCD) controller comprising a plurality of outputs, an external interface comprising a plurality of external pins, and a multiplexer operable in a first mode to connect the plurality of external pins with the plurality of outputs of the LCD controller and in a second mode to connect at least one of the plurality of external pins with the touch controller.

According to a further embodiment of the integrated circuit device, the integrated circuit device may further comprise a central processing unit operable to control the multiplexer. According to a further embodiment of the integrated circuit device, the integrated circuit device may further comprise a state machine operable to control the multiplexer. According to a further embodiment, the integrated circuit device is a microcontroller. According to a further embodiment, when operating in the second mode, a subset of the plurality of external pins can be connected together along with the at least one input of the touch controller. According to a further embodiment, the touch controller can be a capacitive voltage divider (CVD) controller. According to a further embodiment of the integrated circuit device, the integrated circuit device may further comprise an analog-to-digital converter (ADC) coupled with the CVD controller and the at least one external pin. According to a further embodiment, the ADC may comprise a sampling capacitor coupled with the ADC and a controllable driver coupled with the sampling capacitor and the CVD controller. According to a further embodiment of the integrated circuit device, the integrated circuit device may further comprise a digital-to-analog (DAC) converter coupled with the CVD controller, wherein the ADC is coupled with a first one of the plurality of external pins and the DAC is connected with a second one of the plurality of external pins. According to a further embodiment, the LCD driver and the CVD controller can be synchronized. According to a further embodiment, the touch controller may comprise a charge time measurement unit, a relaxation oscillator, or an impedance phase shift sensor.

According to another embodiment, a system may comprise an integrated circuit device as described above, further comprising a liquid crystal display having segment electrodes and common electrodes which are each coupled with the external pins of the integrated circuit device.

According to another embodiment, a system may comprise an integrated circuit device as described above wherein segment electrodes and common electrodes of the liquid crystal display are controlled by the integrated circuit device.

According to yet another embodiment, a method of operating an integrated circuit device coupled with a liquid crystal display (LCD) can be provided, wherein the integrated circuit device comprises a touch controller comprising at least one input, a liquid crystal display (LCD) controller comprising a plurality of outputs, an external interface comprising a plurality of external pins coupled with segment electrodes and common electrodes of the LCD, and a multiplexer operable in a first mode to connect the plurality of external pins with the plurality of outputs of the LCD controller and in a second mode to connect at least one of the plurality of external pins with the touch controller, wherein the method may comprise: a) connecting for a first time period the segment electrodes and the common electrodes by means of the multiplexer with the LCD controller, and b) connecting for a subsequent time period the at least one input of the touch controller with at least one of the segment electrodes and common electrodes.

According to a further embodiment of the method, the method may further comprise repeating steps a) and b). According to a further embodiment of the method, the multiplexer can be controlled by a central processing unit of the integrated circuit device. According to a further embodiment of the method, the multiplexer can be controlled by a state machine of the integrated circuit device. According to a further embodiment of the method, the touch controller may use a capacitive voltage divider method to determine whether a touch of the LCD has been performed. According to a further embodiment of the method, the LCD controller and the CVD controller can be synchronized. According to a further embodiment of the method, the touch controller may comprise a charge time measurement unit, a relaxation oscillator, or an impedance phase shift sensor.

DETAILED DESCRIPTION

Figure 1:
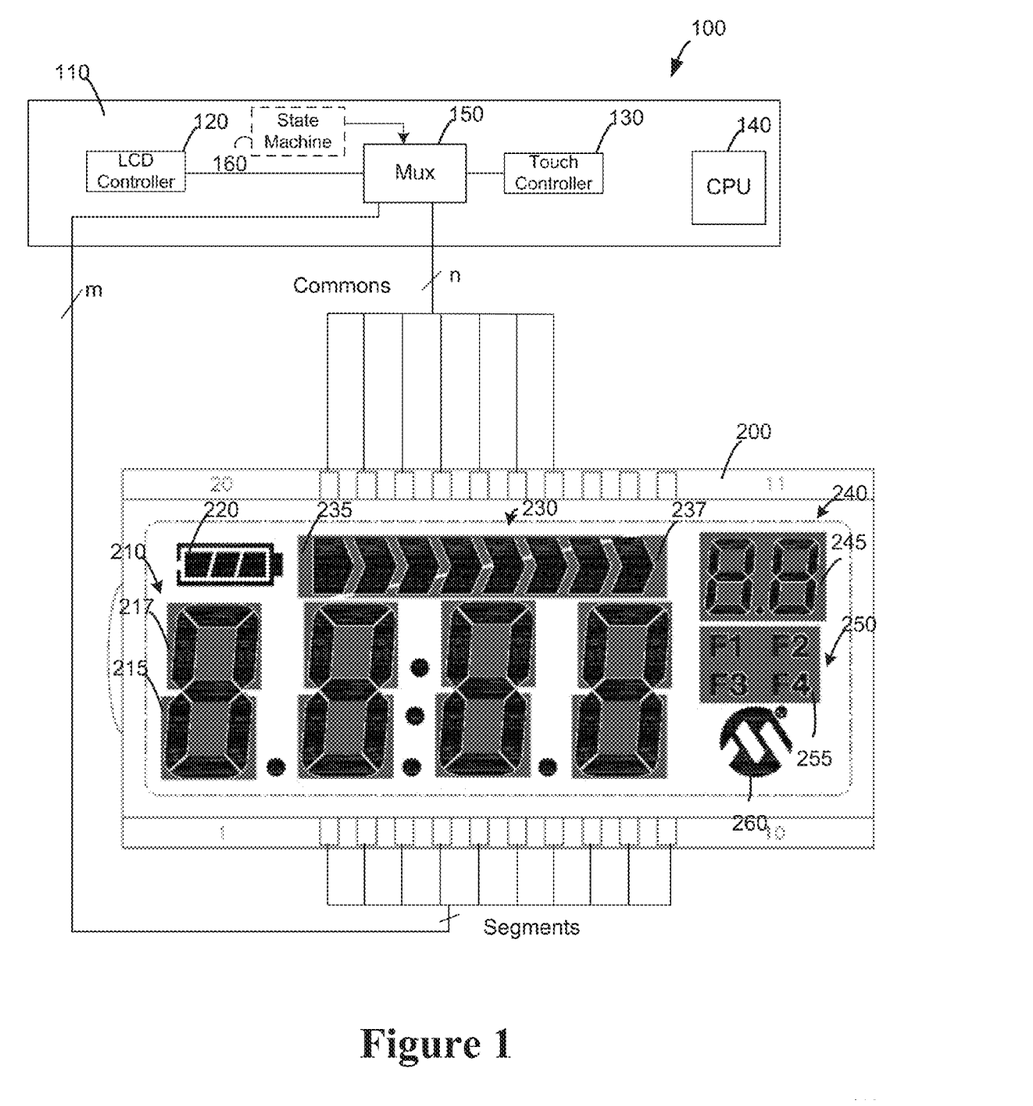
FIG. 1 shows a system with an LCD display and microcontroller according to an embodiment.

According to various embodiments, a controller capable of interfacing with a touch screen display using for example less expensive segmented liquid crystal displays (LCD) and a lower cost button based capacitive touch input can be provided. FIG. 1 shows a system 100 with an embodiment of a microcontroller 110 with an integrated human device interface coupled with an external LCD 200. The LCD 200 may comprise a plurality of 7-segment main display numbers 210 arranged for example to display a time or other value, and secondary 7-segment numbers 240, for example to indicate any other type of value as a real or integer number. Graphical symbols 220, 230 such as bar graphs, etc. and other fields 250 may be used to indicate certain operating modes or functions. The display 200 is a low cost display without a specific controller and must therefore be directly driven by a microcontroller 110 with integrated LCD controller 120.

Each display segment electrode is therefore externally accessible for connection to microcontroller 110. For example as shown in FIG. 1 an LCD may comprise m external pins for m segment electrodes. As shown, the LCD 200 may furthermore comprise a plurality of n common connections wherein associated internal common electrodes are the counter electrodes for respective LCD segment electrodes. For example, LCD 200 may provide external connections to the common electrodes 215, 217 associated with 7-segment number 210, common electrodes 235, 237 associated with bar graph 230, common electrode 245 and 255 associated with display segments 240 and 250, respectively. However, according to other embodiments, a single common electrode or multiple common electrodes may be provided. FIG. 1 shows some examples of common electrodes wherein more than one common electrodes is provided for multiple segments or segment groups. For example, graphic symbols 220 and 260 may share a single common electrode (not shown). However, providing multiple common segments can be beneficial, in particular when the segments and commons are also used as electrodes for capacitive touch control according to various embodiments. According to various embodiments, the segment electrodes and/or the common electrodes are used for touch sensing in addition to their primary LCD function, Thus, an LCD can be used to allow a direct user input functionality by touching or approaching the display.

The controller 110 can be for example a microcontroller with a central processing unit 140. The microcontroller 110 may furthermore comprise an integrated LCD controller 120, for example a state machine, and an integrated touch controller 130. In addition, a dedicated multiplexer 150 is provided which allows to couple the external pins for the commons and/or segment connections to either the LCD controller 120 or the touch controller 130 for example under control of CPU 140. However, according to some embodiments, an automatic time division function between touch detection and LCD driver function may be implemented that does not require active control of the multiplexer by the CPU. As shown in FIG. 1, for example a simple state machine 160 may be provided for providing the respective switching function. The state machine 160 would also provide respective signals to the LCD controller 120 and the touch controller 130 for automatically performing their respective functions when connected to the external pins. Whenever a touch function has been detected, the touch controller could then simply initiate an associated interrupt. Thus, the CPU would be free to perform other functions while LCD function and touch recognition are maintained.

According to some embodiments, only selected electrodes of the LCD display may be used for touch sensing. For example, all segment electrodes associated with a number may be coupled in parallel by the multiplexer and coupled with a single input of the touch controller while these electrodes are separately driven when connected with the LCD driver 120. Depending on the measurement method applied by the touch controller it may be more beneficial to only use the common electrodes or the segment electrodes as touch sensors. According to other embodiments, a combination of segment electrodes and common electrodes may be used for touch sensing.

According to an embodiment, a controller is provided to directly drive the LCD and to evaluate a capacitive touching of the display. The controller can be configured to evaluate a touching of the display and provide a resulting event signal which for example could be fed to a host or further processed within the controller. To this end, the controller may comprise a touch controller 130 such as for example, a capacitive voltage divider (CVD) controller, a charge time measurement unit CTMU, a relaxation oscillator, impedance phase shift sensor, or any other method of determining a capacitive touch, as known in the art.

Figure 2A:
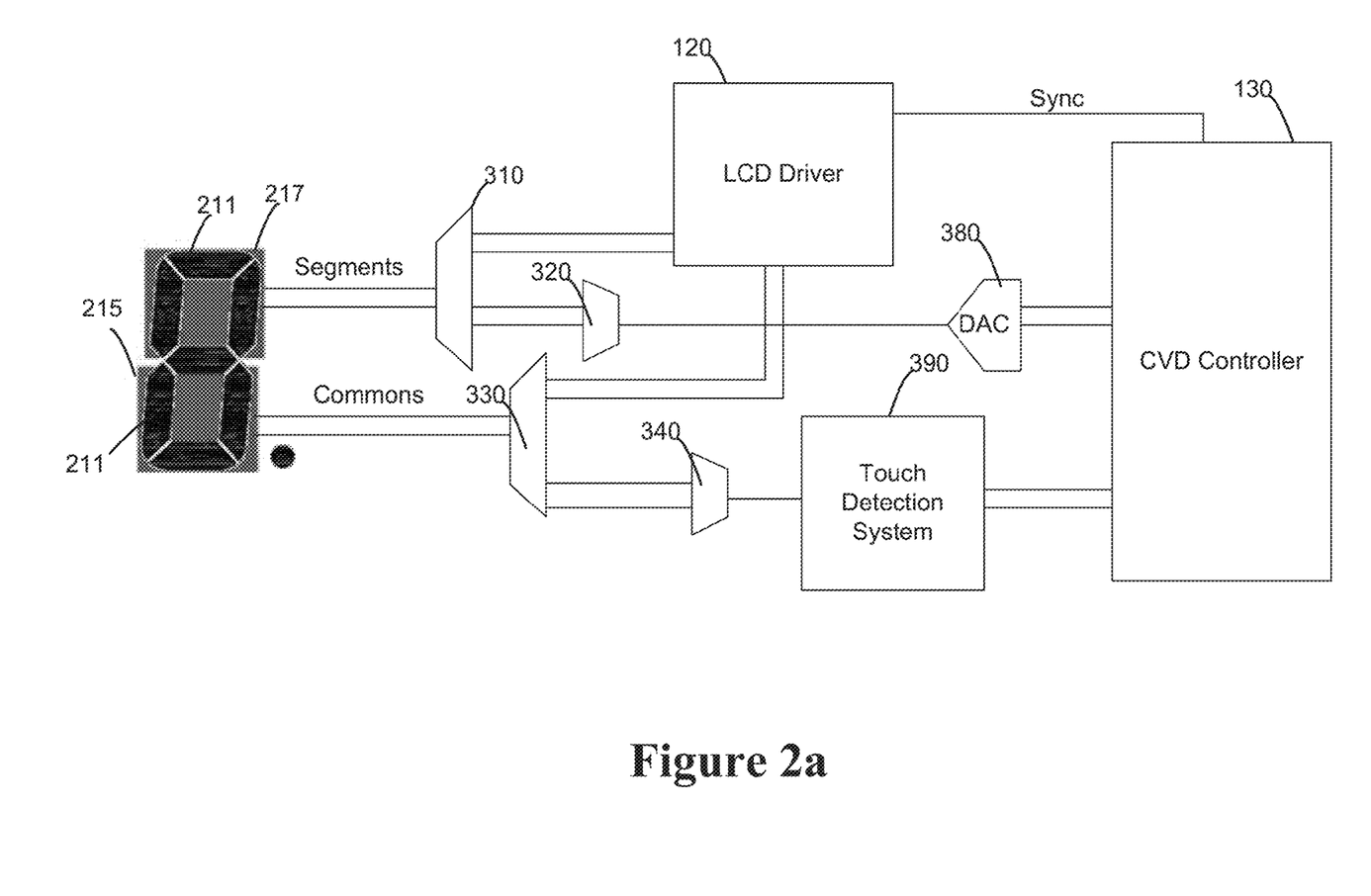
FIGS. 2a and 2b show more detailed block diagrams of a system with a controller device according to various embodiments.
Figure 2B:
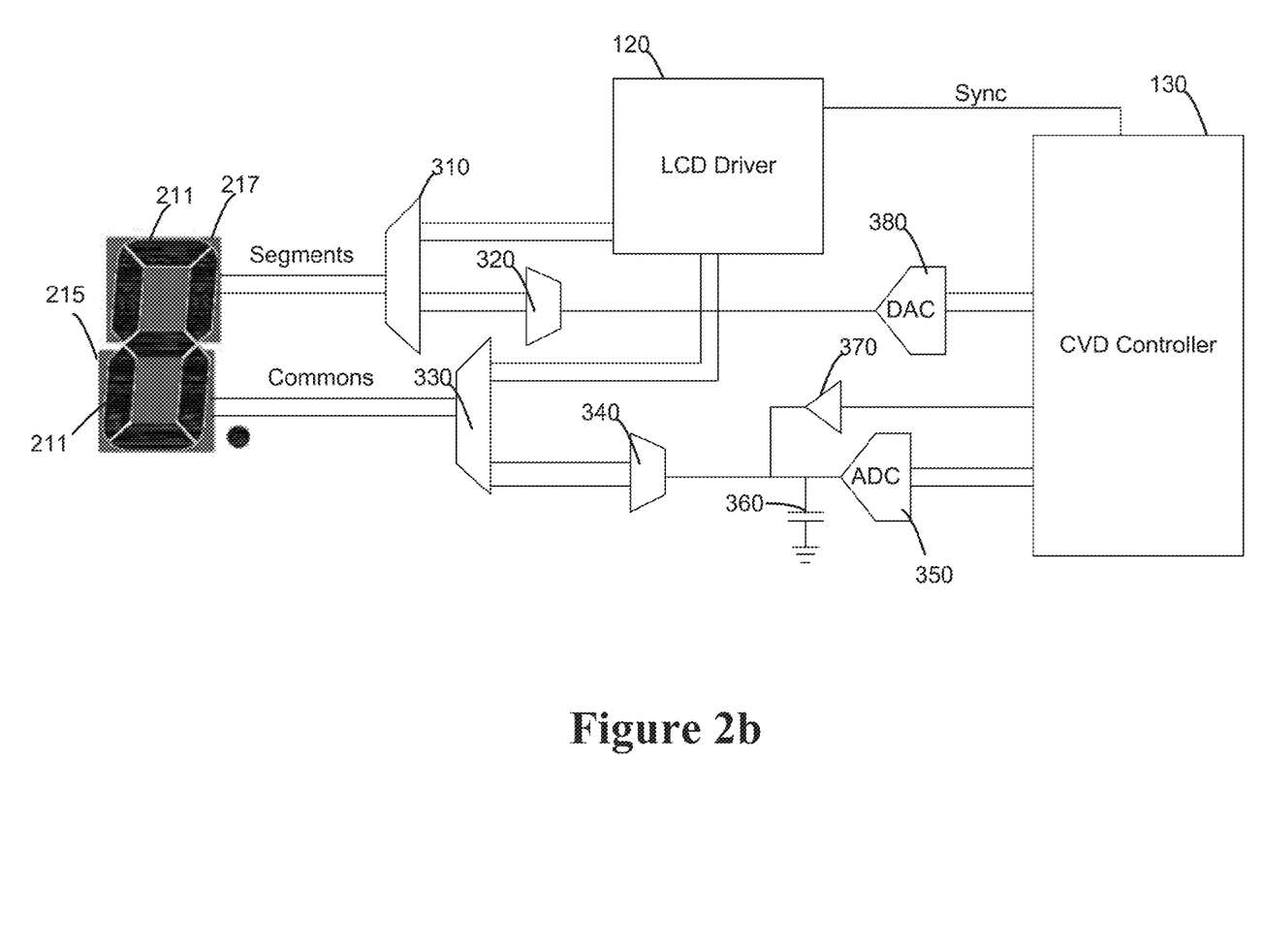

FIGS. 2a and 2b show a more detailed view of possible implementations of switch circuitry forming a multiplexer to couple the segment electrode and common electrodes of an LCD with the respective LCD driver 120 and touch controller 130. FIGS. 2a and 2b only show a single 7-segment display to provide a better overview. However, any number of display elements may be used according to various embodiments. Here, the 7-segment display includes seven segment electrodes 211 and a decimal point segment electrode, as well as two separate common electrodes 215 and 217. Another general common electrode may be associated with the decimal point. However, common electrode 215 may also be designed larger to encompass the decimal point according to some embodiments.

Microcontroller 110 comprises a first multiplexer 310 that is configurable to couple the segment electrodes 211 with either the LCD driver 120 or through another multiplexer 320 with digital to analog converter 380, which is controlled by the CVD touch controller 130. Similarly, the common electrodes can be either coupled with LCD driver 120 through multiplexer 330 or through another multiplexer 340. FIG. 2a shows a block diagram with a generic touch detection system. Here the output of multiplexer 340 is coupled with a touch detection system 390. FIG. 2b shows an embodiment in which the touch detection system is implemented by a capacitive voltage divider system wherein the output of multiplexer 340 is coupled with sampling capacitor 360. Sampling capacitor 360 is furthermore coupled with analog-to-digital converter (ADC) 350 and with a driver 370 which is configurable to pre-charge or discharge capacitor 360. ADC 350 and driver 370 are controlled by touch controller 130.

The system would be designed to synchronize the scanning of a multiplexed LCD display with a CVD capacitive touch peripheral formed by CVD controller 130, ADC 350, driver 370 and DAC 380 or any other touch detection system 390. According to one embodiment, touch recognition can be performed by using one or more selected common electrodes or one or more segment electrodes as shown in the example of FIGS. 2a and 2b. For example, in one mode, one electrode 215 may be used or a plurality of common electrodes 215, 217 may be switched together and used for CVD measurements. In a CVD measurement, as shown in FIG. 2b, the system is configurable to charge the external capacitor formed, for example, by the common electrode(s) to a predefined voltage and discharge the internal capacitor 360. After a predetermined time, both capacitances are coupled in series wherein the capacitors form a voltage divider and a certain voltage will settle on the internal capacitor 360 depending on the value of the external capacitor. This voltage can then be measured by the ADC 350 to determine whether a touch has been performed or not. The measurement can also be performed in a reversed arrangement in which the internal capacitor 360 is charged and the external capacitor is discharged. Respective switches to perform this function are present but not shown in FIG. 2. The driver 370 can be used to charge the external or internal capacitor.

Figure 3:
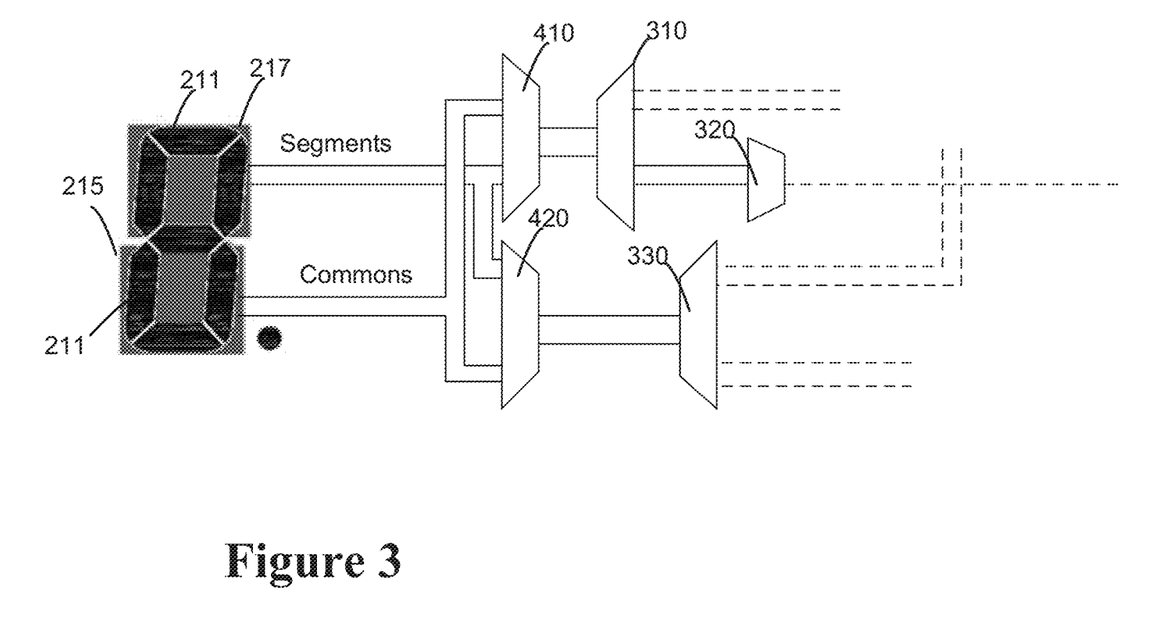
FIG. 3 shows details of an enhanced block diagram allowing to select either commons or segments as sensors or guard electrodes.

According to various embodiments, either the common electrodes or the segment electrodes of an LCD can be used in a touch recognition system. If the common electrodes are used, then the segment electrodes form parasitic capacitance and vice versa. Also any other unused electrode may form such parasitic capacitance. These parasitic capacitances formed by the unused segments and/or the commons negatively influence the CVD measurement. Hence, according to a further embodiment, the unused electrodes or at least some of the unused electrodes of an LCD can be driven with a voltage that is close or equal to, for example, the voltage that will be established on the sensor electrode after it has been connected in series with the internal capacitor 360. Thus, the parasitic capacitive effect is minimized. This voltage is either known or could be dynamically determined after each measurement. Alternatively, a fixed voltage, for example, half the supply or half the output voltage of driver 370 could be used as a bias voltage for the unused electrodes. FIG. 2 shows an example in which the common electrodes 215, 217 are used as sensor electrodes and the segment electrodes 211 are used as guard electrodes which can be driven by the digital-to-analog converter 380 when the system is in the touch recognition mode. The controller device can furthermore comprise additional multiplexers 410, 420 as shown in FIG. 3 that are configurable to select which electrodes, commons or segment, are used as sensing electrodes and which ones are used as guard electrodes. Other selection multiplexers may be used to individually select certain electrodes for either function. Preferably, the unused electrodes surrounding a sensing electrode may be switched together and may be driven by the DAC 380 to form a guard ring around the sensing electrode. FIG. 3 shows otherwise the same elements as FIG. 2 wherein the dashed lines indicate the connections to elements not shown in FIG. 3.

Furthermore according to some embodiments, a synchronization connection Sync between the LCD controller 120 and CVD controller 130 may be provided as shown in FIG. 2. This allows the use of the LCD commons or segments as touch sensors. As stated above, because the LCD segments have a large parasitic capacitance with respect to the LCD commons and vice versa, it may be necessary or beneficial that a guard ring type drive be employed to drive the segments for a system that uses the commons as touch sensors, and vice versa for systems that use the segments as touch sensors. It will also be necessary to synchronize the scanning with the touch detection to prevent contention between the systems.

The various electrodes within an LCD may allow for various touch functions including gestures that can be detected by touch controller 130. For example, if the user draws a finger from the top to the bottom of a 7-segment number, the respective number can be increased or decreased. If a user draws the left most digit to the right, the entire value may shift down through the digits, for example with the right most values 'falling off'. According to further embodiments, if the user draws their finger from the right most digit to the left, the value may shift up through the digits with the right most value back filled with zeros. Other gesture decoding may be implemented.

Further examples of functions are explained with reference to FIG. 4. For Individual indicators (F1, F2, F3 & F4) as shown in the top area of FIG. 4: When the user touches the transparent capacitive touch sensor over the indicator, the touch detector peripheral or software running in the controller registers the touch and toggles the state of the indicator. With the existing LCD segments used as sensor elements, multiplexing is used to provide display and sensing functionality at the same time. To avoid any type of flicker, the switching can be performed fast enough to be invisible for the human eye.

Figure 4:
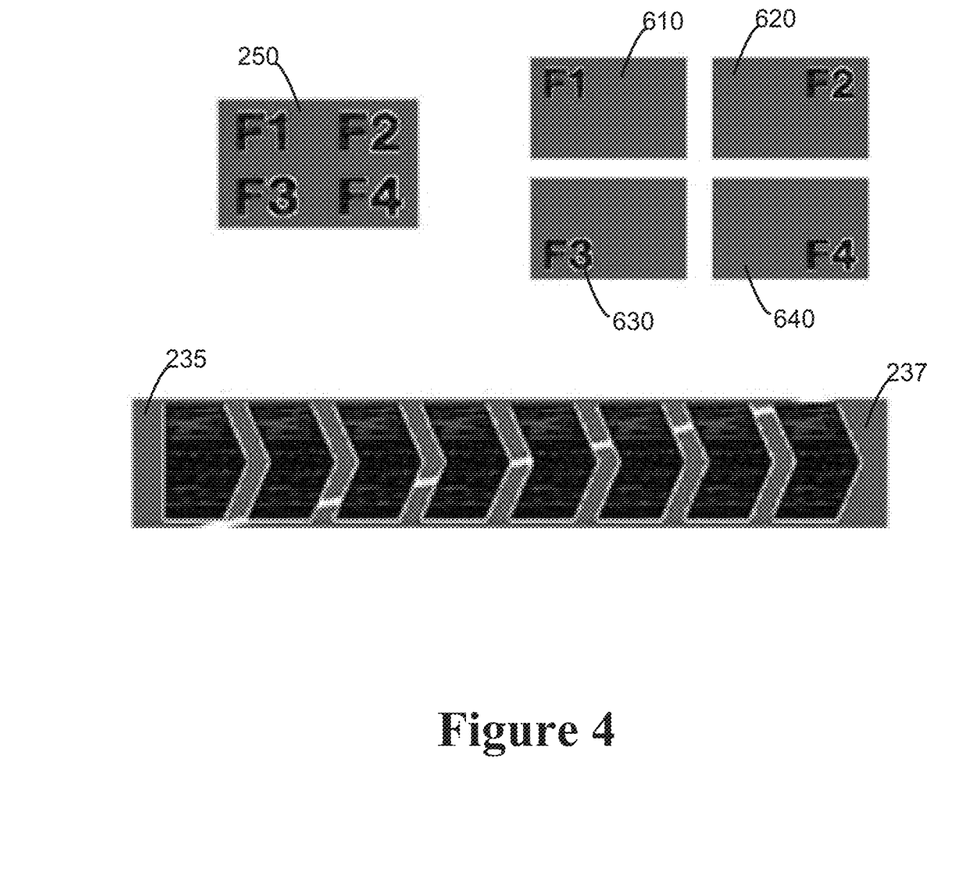
FIG. 4 shows exemplary sensor pad arrangements for an LCD.

For Sliders, the common electrodes may be formed as shown in the bottom area of FIG. 4: When the user touches the area above the triangular common electrodes 230, 235 over the bar graph, the relative shift of capacitance in both electrodes 235, 237 can be measured and the ratio is used to set the number of segments to be activated in the display. The various embodiments, in particular with respect to the size and shape of an electrode are not restricted to the shown examples. Rather, any type, size and shape of common electrode may be implemented within an LCD as long as the display function is maintained. Furthermore, even though the 7-segment numbers show two associated common electrodes, the various embodiments are not limited to the number of common electrodes. Thus, as mentioned above more than one common electrode may be provided within a low cost LCD display. Also, dot matrix LCDs may be used wherein a plurality of dot segments may be connected in parallel to form a touch sensor. Thus, individual sensors may be formed by the respective switching unit. Hence, a controller may be able to detect more than a simple vertical or horizontal movement.

The various embodiments provide for a lower cost solution, and intuitive interface by providing a simple touch based input interface. Thus, for example existing peripherals for input such as provided in a microcontroller can be used. The various embodiments also provide for simple mounting and interface. as discussed above, the capacitive touch sensor pads can be provided within an LCD display or added to the back of an LCD display. In particular according to an embodiment, transparent metal layers can be patterned with conventional technologies to form the respective touch sensor areas within an LCD display.

What is claimed is:
1. An integrated circuit device comprising:
   a touch controller comprising at least one input,
   a liquid crystal display (LCD) controller comprising a plurality of outputs, wherein the LCD controller is configured to drive a segmented LCD comprising a plurality of segment electrodes and common electrodes wherein each segment electrode and each common electrode is individually accessible for connection, wherein the segment electrodes are arranged in groups spaced apart from each other and wherein at least one group forms a seven-segment display,
   a plurality of external connections wherein each segment electrode and each common electrode is coupled with one of said plurality of external connections, and
   a multiplexer operable in a first mode to connect said plurality of external connections with said plurality of outputs of the LCD controller and in a second mode to connect at least one of said plurality of external connections connected to a common electrode with said touch controller, wherein the common electrode is used as a touch sensor electrode.

2. The integrated circuit device according to claim 1, further comprising a central processing unit operable to control the multiplexer.

3. The integrated circuit device according to claim 2, further comprising a state machine operable to control the multiplexer.

4. The integrated circuit device according to claim 2, wherein the integrated circuit device is a microcontroller.

5. The integrated circuit device according to claim 1, further comprising a state machine operable to control the multiplexer.

6. The integrated circuit device according to claim 1, wherein when operating in the second mode, a subset of said plurality of external connections are connected together and with said at least one input of said touch controller.

7. The integrated circuit device according to claim 1, wherein the touch controller is a capacitive voltage divider (CVD) controller.

8. The integrated circuit device according to claim 7, further comprising an analog-to-digital converter (ADC) coupled with the CVD controller and said at least one external pin.

9. The integrated circuit device according to claim 8, wherein a sampling capacitor is coupled with the ADC and a controllable driver is coupled with the sampling capacitor and the CVD controller.

10. The integrated circuit device according to claim 8, further comprising a digital-to-analog (DAC) converter coupled with the CVD controller, wherein the ADC is coupled with a first one of the plurality of external pins and the DAC is connected with a second one of the plurality of external pins.

11. The integrated circuit device according to claim 7, wherein the LCD driver and the CVD controller are synchronized.

12. The integrated circuit device according to claim 1, wherein the touch controller comprises a charge time measurement unit, a relaxation oscillator, or an impedance phase shift sensor.

13. A system comprising:
an integrated circuit device according to claim 1, and
a liquid crystal display having segment electrodes and common electrodes which are each coupled with the external connections of the integrated circuit device.

14. A Liquid crystal display comprising:
an integrated circuit device according to claim 1,
a plurality of segment electrodes, and
a plurality of common electrodes,
wherein the plurality of segment electrodes and the plurality of common electrodes are controlled by the integrated circuit device.

15. The integrated circuit device according to claim 1, wherein a surface area of the common electrode is greater that a surface area of more than one segment electrodes.

16. The integrated circuit device according to claim 15, wherein a surface area of two common electrodes is substantially equal to a surface area of a seven segment electrode group.

17. A method of operating an integrated circuit device coupled with a segmented liquid crystal display (LCD), wherein the segmented LCD comprises a plurality of segment electrodes and common electrodes wherein each segment and each common electrode is individually accessible for connection, wherein the segment electrodes are arranged in groups spaced apart from each other and wherein at least one group forms a seven-segment display, wherein the integrated circuit device comprises a touch controller comprising at least one input, an LCD controller comprising a plurality of outputs, a plurality of external connections coupled with segment electrodes and common electrodes of the segmented LCD, and a multiplexer operable in a first mode to connect said plurality of external pins with said plurality of outputs of the LCD controller and in a second mode to connect at least one of said plurality of external connections which is connected with a common electrode with said touch controller, the method comprising:
a) connecting for a first time period the segment electrodes and the common electrodes by means of the multiplexer with the LCD controller,
b) connecting for a subsequent time period the at least one input of the touch controller with at least one of said common electrodes.

18. The method according to claim 17, further comprising repeating steps a) and b).

19. The method according to claim 17, comprising: controlling the multiplexer by a central processing unit of the integrated circuit device.

20. The method according to claim 17, comprising: controlling the multiplexer by a state machine of the integrated circuit device.

21. The method according to claim 17, wherein the touch controller uses a capacitive voltage divider method to determine whether a touch of the LCD has been performed.

22. The method according to claim 21, further comprising synchronizing the LCD controller and the CVD controller.

23. The method according to claim 17, wherein a surface area of the common electrode covers more than one segment electrode.

24. The method according to claim 23, wherein a surface area of two common electrodes is substantially equal to a surface area of a seven segment electrode group.

* * * * *